United States Patent [19]
Bowman

[11] Patent Number: 5,913,404
[45] Date of Patent: Jun. 22, 1999

[54] PRESSURE ARM FOR FLOATING SKIRT IN CONVEYOR

[76] Inventor: Houston R. Bowman, 321 Millport Rd., Sacramento, Ky. 42372

[21] Appl. No.: 09/133,251

[22] Filed: Aug. 13, 1998

Related U.S. Application Data

[63] Continuation-in-part of application No. 08/841,843, May 5, 1997, Pat. No. 5,816,388.

[51] Int. Cl.[6] ................................................... B65G 21/20
[52] U.S. Cl. ......................................................... 198/836.1
[58] Field of Search ............................... 198/836.1, 836.3

[56] References Cited

U.S. PATENT DOCUMENTS

| | | | |
|---|---|---|---|
| 4,877,125 | 10/1989 | Gordon | 198/836.1 |
| 5,267,642 | 12/1993 | Gharpurey et al. | 198/836.3 X |
| 5,303,813 | 4/1994 | de Rooy | 198/836.1 X |
| 5,816,388 | 10/1998 | Bowman | 198/836.1 |

FOREIGN PATENT DOCUMENTS 1566549  5/1980  United Kingdom ................ 198/836.1

*Primary Examiner*—James R. Bidwell
*Attorney, Agent, or Firm*—Wheat, Camoriano, Smith & Beres, PLC

[57] ABSTRACT

In a belt conveyor system utilizing a floating sealing skirt to prevent spillage of bulk materials from the belt, a plurality of mechanisms is used to exert a downward pressure along the top of the sealing skirt. This pressure forces the sealing skirt against the belt, and-thus maintains the seal between the sealing skirt and belt along the entire length of the skirt.

2 Claims, 3 Drawing Sheets

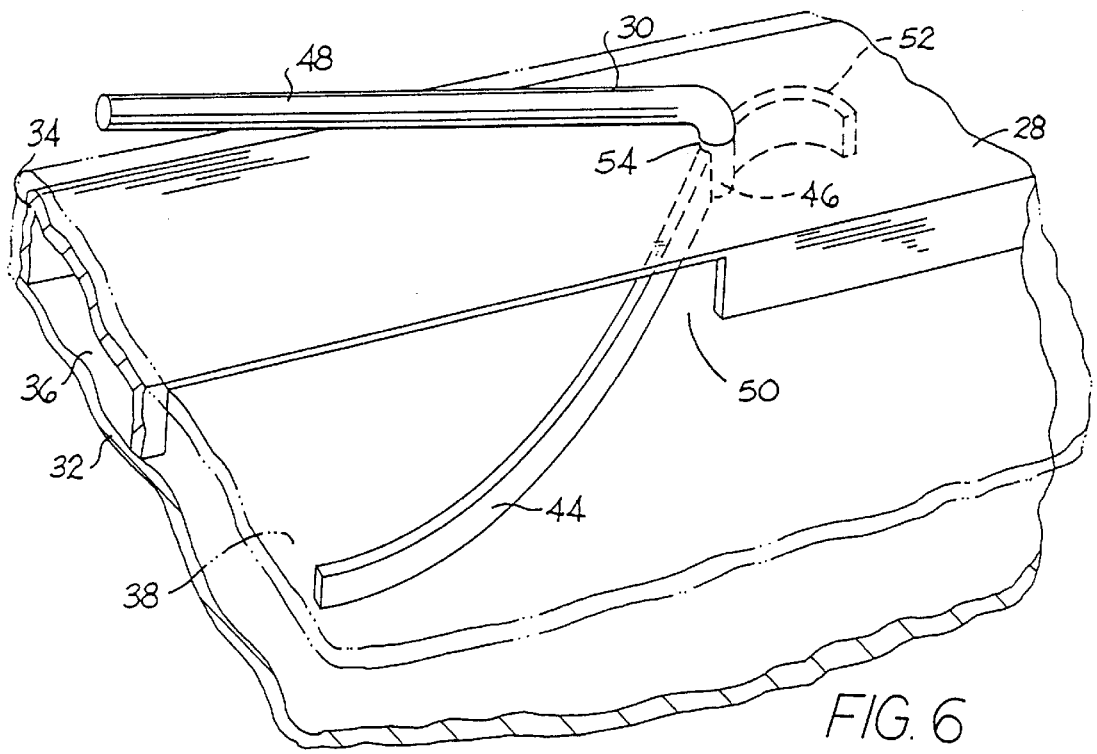
FIG. 6
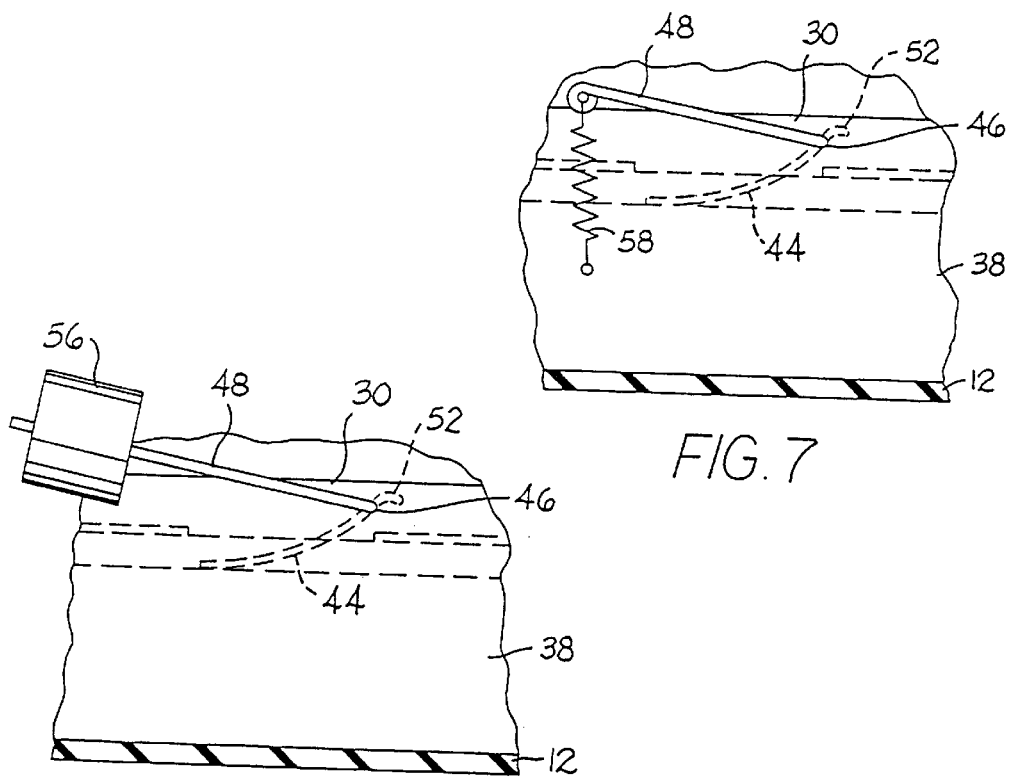
FIG. 7
FIG. 8

PRESSURE ARM FOR FLOATING SKIRT IN CONVEYOR

This is a Continuation-in-Part of application Ser. No. 08/841,843, filed May 5, 1997, now U.S. Pat. No. 5,816,388, issued Oct. 6, 1998.

BACKGROUND OF THE INVENTION

The present invention relates to belt conveyors for carrying free-flowing materials such as coal, ore, or the like, in which the conveyed material is prevented from flowing off of the sides of the belt, and, more particularly, to such belt conveyors that employ side skirts contacting the sides of the belt along their length to prevent the conveyed material from flowing off of the belt.

Belt conveyors are commonly used for the transport of coal, ores, or similar free-flowing materials. During transport of such free-flowing materials, spillage of the transported material over the edges of the belt is a common and often significant problem. Thus, in many belt conveyor systems, the support plates for the belt are troughed to help alleviate the problem of spillage. Troughing, however, is limited by the flexibility of the belt material. As a second solution to the problem of spillage, a sealing skirt is frequently used. These skirts, typically made of rubber, are hung so that their bottom edges are positioned against the conveyor belt along the edges of the conveyor belt, providing a seal against the belt that prevents spillage.

These skirts, however, are prone to rapid wear and deterioration. Friction is created where the skirt contacts the belt; not only does this cause the skirt to wear rapidly, but the belt also may show premature wear. Moreover, particles often become lodged between the skirt and the belt, further accelerating wear of both the belt and conveyor. Thus, frequent and time-consuming replacement of the skirts is necessary. To address this problem, prior art devices have used a floating skirt. In a floating skirt arrangement, the skirt moves downwardly, under the force of gravity, as it wears. The top of the skirt is not held rigidly but is held in a bracket that allows for the downward movement of the skirt as it wears. Use of such a sealing skirt is taught in Holwick U.S. Pat. No. 2,665,795, issued on Jan. 12, 1954.

The floating skirt arrangement, however, presents significant problems of its own. Because the floating skirt is free to move in a vertical plane, large particles may become wedged between the skirt and belt, and actually force the skirt upward, allowing particles to spill from the conveyor. Moreover, wear does not occur uniformly, and portions of the skirt having worn more rapidly than others may rise above the belt. Therefore, it would be desirable to provide a skirt that prevents the spillage of coal from a conveyor belt and compensates for the wearing of said skirt while uniformly maintaining an appropriate seal at all points along both sides of the belt.

Maintenance expense and downtime are the principal problems that prior art inventions seek to address. Thus, it is further desirable to provide a sealing skirt that is easily replaced, minimizing conveyor downtime.

SUMMARY OF THE INVENTION

The present invention employs a mechanism for providing a downward pressure against the top of a floating skirt to maintain the seal between the skirt and the conveyor belt.

In a preferred embodiment of the present invention, a pivoting pressure arm assembly is used to maintain the seal between the skirt and the belt. The pressure arm is a curved blade that rotates around a fixed pivot point. The first end of the pressure arm abuts against the top of the skirt. A force is applied to the second end of the pressure arm so that the arm is rotated downwardly, forcing the first end against the top of the skirt. The pressure can be applied by a spring, weight, or other similar device. These pressure arm assemblies are positioned at predetermined intervals along the skirt.

The pressure arm assemblies thus provide a constant force along the top of the skirt, forcing the skirt against the conveyor. As the skirt wears, it moves downward, not only under the force of gravity, but under the additional force provided by the pressure arm assemblies; thus, the seal is maintained at all times. Furthermore, the force supplied by the pressure arm assemblies prevents the skirt from being forced upward.

The curved pressure arm of the embodiment also provides a stop that prevents the pressure arm from inadvertently striking the belt or associated equipment as the skirt wears.

The present invention further allows for easy replacement of the skirt. A replacement skirt can be inserted into the channel housing in the pressure arm assemblies without relative ease; no complex bolting or attachments are necessary.

BRIEF DESCRIPTION OF THE DRAWINGS

FIG. 6 is a partial perspective view of the channel of FIG. 3 with the sealing skirt and outer wall removed for clarity;

FIG. 7 is a side view of an embodiment of the present invention wherein the force-generating apparatus is spring; and FIG. 8 is a side view of an alternate embodiment of the present invention wherein the force-generating apparatus is a sliding counterweight.

DESCRIPTION OF THE PREFERRED EMBODIMENTS

A belt conveyor is one of the most common means of transporting bulk materials. In a typical belt conveyor, materials are fed from a hopper onto a belt which is driven by a drive unit. The belt is constructed of a rubber or similar elastomer and supported by a series of idler rollers.

To prevent spillage of the bulk material over the sides of the conveyor belt during operation of the conveyor, the belt is typically enclosed by a housing with a top and opposing side walls. The side walls project downwardly with the bottom edges thereof spaced just above the surface of the belt at the belt's edges. To prevent wear, the walls do not actually contact the belt surface; thus, there is a space through which smaller particles may pass, spilling from the belt.

To minimize this spillage, many prior art conveyors have vertically movable, gravity-operated sealing skirts that are positioned adjacent to the side walls of the belt housing.

These sealing skirts are constructed of rubber or a similar elastomer and contact the belt along its edges to form a seal against the upper surface of the belt. As the bottom edges of the skirt began to wear, the skirt moves downwardly under the force of gravity, maintaining the seal against the belt.

As discussed above, however, applicant has noted that the seals between the prior art skirts and the conveyor belt are not always uniform, particularly as the skirts become increasingly worn through use. The preferred embodiment of the present invention addresses this problem by providing a mechanism that supplies a constant downward force along the entire top edge of the sealing skirt so that it continues to maintain a substantially uniform seal with the belt at all times.

Figure 1:
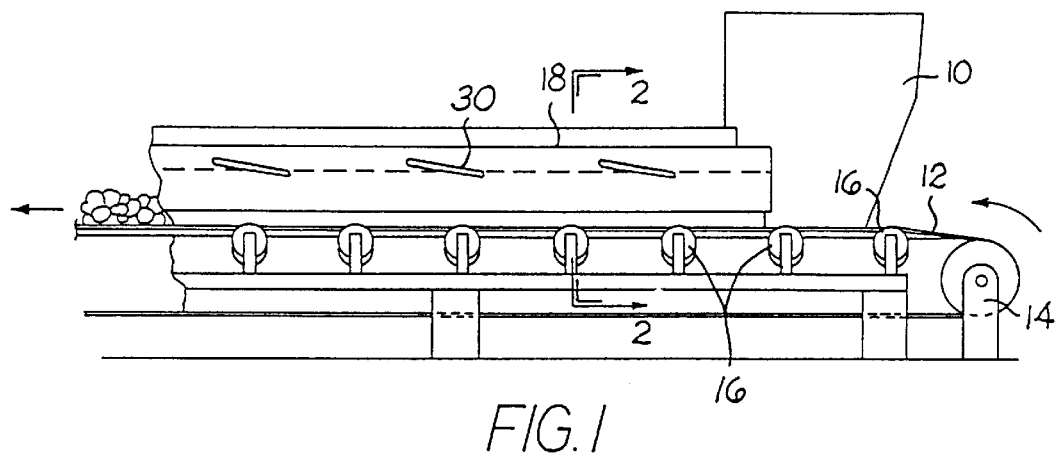
FIG. 1 is a side view of an embodiment of the present invention installed on a typical belt conveyor.
Figure 2:
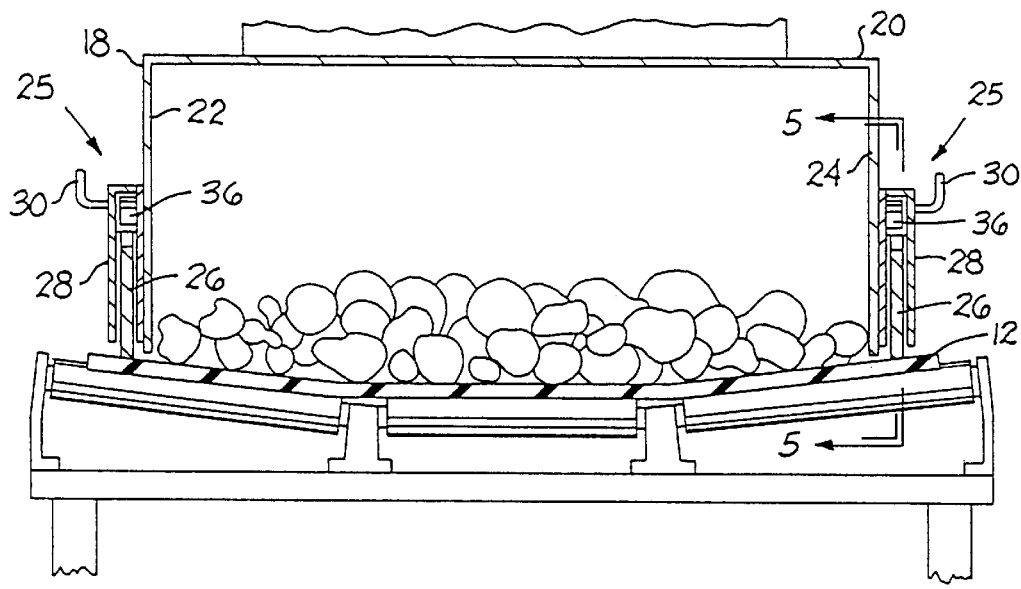
FIG. 2 is a sectional view taken along line 2—2 of FIG. 1.

FIGS. 1 and 2 depict generally a belt conveyor assembly implementing the present invention. A hopper 10 feeds the bulk material (e.g., coal, ore, or the like) onto the upper surface of a belt 12 driven by a drive unit 14 over a series of idler rollers 16, the idler rollers 16 being spaced at predetermined intervals to provide support for the belt 12. A housing 18, having a top wall 20 and side walls 22,24 encompasses the belt 12, essentially along its entire carrying length.

Figure 3:
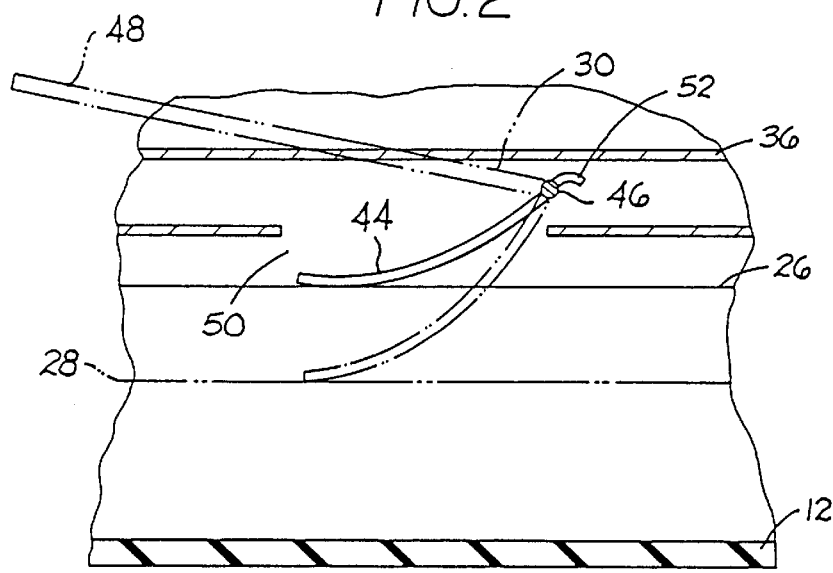
FIG. 3 is an end view of the channel that houses the sealing skirt.

Attached to each side wall is a sealing mechanism 25, comprising a sealing skirt 26 and a channel member 28 that houses the sealing skirt 26. The specific features of the channel member are best seen in the views afforded by FIGS. 3 and 6. The channel member 28 comprises an inner wall 32, that is welded or otherwise secured to the belt housing 18; a C-shaped member 34 welded to and forming a duct 36 with the inner wall 32; and an outer wall 38. The outer wall 38 is preferably bolted to the duct 36 so that it can be easily and expeditiously removed when desired, allowing unimpeded access into the interior of the channel 28 to replace a worn sealing skirt 26. All components of the channel member 28 are preferably fabricated from ¼" steel plate. Furthermore, the duct 36 preferably has a width of about 1" and a height of about 2".

Figure 4:
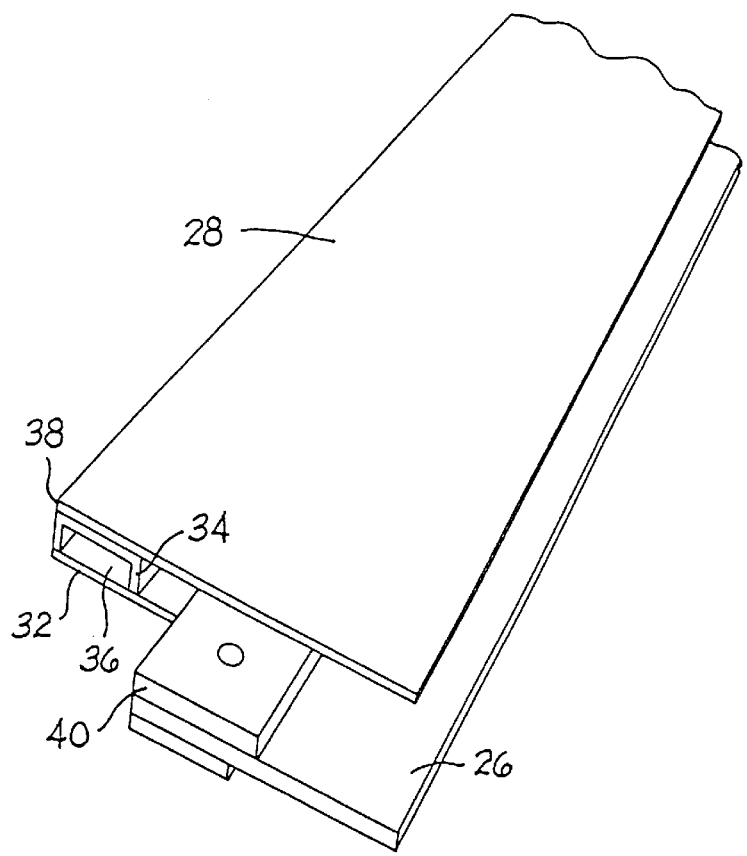
FIG. 4 is a partial perspective view of the channel and sealing skirt of FIG. 3.

As shown in FIG. 4, the sealing skirt 26 extends a short distance beyond the end of the channel 28. The sealing skirt 26 is prevented from moving horizontally within the channel 28 by a stop 40 attached to the end of the skirt 26. In the preferred embodiment, additional layers of skirt material are bolted to the sealing skirt 26 at the ends of the skirt 26 to create the stop 40. This stop 40 has a thickness greater than the width of the channel 28, thus preventing horizontal movement of the sealing skirt 26 within the channel 28.

Figure 5:
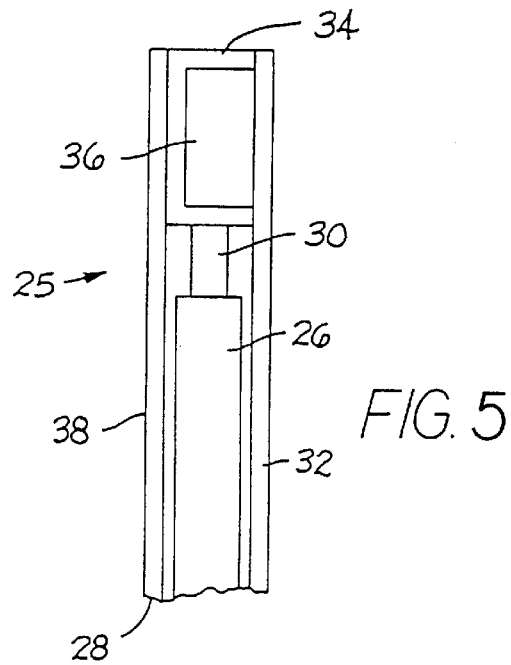
FIG. 5 is a side sectional view taken along lines 5—5 of FIG. 2.

In the preferred embodiment, the sealing mechanism 25 further includes a pressure arm assembly 30 that provides the downward pressure against the top of the sealing skirt 26 that is necessary to maintain the seal between the skirt 26 and the conveyor belt 12. As shown of FIG. 5, the pressure arm assembly 30 comprises a curved blade 44 that is pivotably connected to a support structure 46, and an extension arm 48 that provides the torque that holds the blade 44 against the sealing skirt 26. The support structure 46 is preferably a pin or dowel and is housed within the duct 36 at the top of the skirt support channel 28. The blade 44 extends downward from the support structure 46 through an opening 50 in the duct 36 and into the channel 28 where it contacts the top edge of the sealing skirt 26. A short upper curved section 52 of the blade 44 extends upward just past the support structure 46. As the blade 44 is rotated downward, this upper curved section 52 provides a stop, allowing the blade 44 to rotate downward only until the upper curved section 52 contacts the duct 36.

The extension arm 48 provides the torque necessary to rotate the blade 44. As shown in FIG. 6, the extension arm 48 is attached to the blade 44 at the support structure 46. The arm extends outward through an opening 54 in the duct 36 and the channel outer wall 38. The extension arm 48 is then bent ninety degrees to create a torque arm.

To create the necessary torque, a force must be applied to the end of the torque arm. In FIG. 7., an embodiment is shown wherein a spring 58 provides the force. The spring 58 is used with one end of the spring 58 being attached to the end of the extension arm 48 and the second end of the spring 58 being fixed to the outer wall 38 of the channel 28. Moreover, the pressure arm assemblies 30 are arrayed at predetermined intervals along the length of the sealing skirt 26, providing a uniform sealing force along the entire length of the sealing skirt 26.

Other structures may be used to provide the downward biasing force at intervals along the top of the sealing skirt 26. For example, as illustrated in FIG. 8, a sliding counterweight 56 provides the force on the extension arm 48, creating the torque that rotates the blade 44 against the sealing skirt 26.

The present invention thus relates to a mechanism for maintaining the seal between a floating sealing skirt and a belt in a belt conveyor system by providing a downward pressure across the top of the sealing skirt. The present invention also facilitates skirt replacement and lessens maintenance costs. From a reading above, it may be seen that those skilled in the art may modify and vary the described structure without departing from the spirit and scope of the attached claims.

What is claimed is:

1. A belt conveyor assembly comprising:

a conveyor housing;

a channel member, said channel member being defined by
an inner wall secured to the conveyor housing,
a top member secured to and forming a duct with the inner wall, and
an outer wall removably secured to the top member opposite and substantially parallel to the inner wall; and a sealing skirt housed within the channel member, wherein the sealing skirt has a length sufficient to extend beyond the length of the channel member, and further including a stop to prevent said skirt from freely moving horizontally within the channel member, said stop being attached to a portion of said skirt that extends beyond the length of the channel member.

2. The sealing skirt of claim 1, wherein the stop is composed of additional layers of the skirt material.

* * * * *